United States Patent [19]

Vonk et al.

[11] Patent Number: 4,891,704

[45] Date of Patent: Jan. 2, 1990

[54] SYSTEM FOR ASYMMETRICAL SIGNAL TRANSMISSION

[75] Inventors: Franciscus T. J. Vonk; Cornelis A. M. Wesche, both of Eindhoven, Netherlands

[73] Assignee: U.S. Philips Corporation, New York, N.Y.

[21] Appl. No.: 246,896

[22] Filed: Sep. 16, 1988

Related U.S. Application Data

[63] Continuation of Ser. No. 850,808, Apr. 10, 1986, abandoned.

[30] Foreign Application Priority Data

Apr. 17, 1985 [NL] Netherlands ................... 8501120

[51] Int. Cl.$^4$ ............................................. H04N 5/21
[52] U.S. Cl. .................................. 358/143; 358/198; 358/167
[58] Field of Search ................ 358/167, 145, 142, 85, 358/86, 141, 198; 455/3

[56] References Cited

U.S. PATENT DOCUMENTS

| | | | |
|---|---|---|---|
| 4,275,270 | 6/1981 | de la Plaza | 379/405 |
| 4,433,215 | 2/1984 | Wortman | 379/345 |
| 4,627,076 | 12/1986 | Staal et al. | |

FOREIGN PATENT DOCUMENTS 0148917 12/1978 Japan .................................. 358/167

OTHER PUBLICATIONS

"Domestic or Similar Electronic Equipment Interconnection Requirements: Peritelevision Connector" CENELEC-1983 Ref. No. EN50049:198JE.
Hay, Thomas M. "Differential Technology in Recording Consoles and the Impact of Transformerless Circuitry on Grounding Technique" Audio Engineering Society Preprint 1981.

*Primary Examiner*—James J. Groody
*Assistant Examiner*—David E. Harvey
*Attorney, Agent, or Firm*—Edward W. Goodman

[57] ABSTRACT

System for asymmetrical signal transmission from a pair of transmission devices (AT,VT) through a pair of signal paths (ASL, ARL; VSL, VRL) each having at least one signal line (ASL, VSL) and one reference line (ARL, VRL) to a pair of receiver devices (AR', VR), two devices (AT, VT) of which having a supply reference potential (G1) in common and being coupled to one end of each of the two signal paths (ASL, VSL), and the other two devices (AR', VR) of which having a further supply reference potential (G2) in common and being coupled to the other end of each of the two signal paths (ASL, VSL). In order to prevent unwanted cross-talk in such a system, which cross-talk may be caused through the connections of the reference lines (ARL, VRL) of the two signals paths (ASL, ARL; VSL, VRL) to the two supply reference potentials (G1, G2), a differential stage (DS) for common mode suppression is disposed in at least one (AT) of the said devices between a pair of input terminals (IS, IR) and a pair of output terminals (OS, OR). If disposed in one of the said transmission devices the differential stage (DS) is coupled at one end through a signal terminal (IS) of the pair of input terminals (IS, IR) to a signal source (A) and through a reference terminal (IR) to one (G1) of the two supply reference potentials and at the other end through a signal terminal (OS) of the pair of output terminals (OS, OR) to the signal line (ASL) and through a reference terminal (OR) to the reference line (ARL) of one of the two signal paths.

11 Claims, 2 Drawing Sheets

SYSTEM FOR ASYMMETRICAL SIGNAL TRANSMISSION

This is a continuation of application Ser. No. 850,808, filed Apr. 10, 1986, now abandoned.

BACKGROUND OF THE INVENTION

The invention relates to a system for asymmetrical signal transmission from a pair of transmission devices through a pair of signal paths, each having at least one signal line, and one reference line to a pair of receiver devices, two devices of which have a supply reference potential in common and are coupled to one end of each of the two signal paths, and the other two devices of which have a further supply reference potential in common and are coupled to the other end of each of the two signal paths. The invention also relates to a transmission and receiver device for use in such a system.

The system may be realized when interconnecting electronic devices — such as, for example, a TV receiver to peripheral equipment (e.g. a video recorder, a video disc player, a TV monitor, etc.) — in accordance with the European standard ratified on 7 July 1982 and published by the European Committee for Electrotechnical Standardization (CENELEC) in the report EN 50049 "Domestic or similar electronic equipment interconnection requirements: peritelevision connector", of December 1983. The plugs and sockets as defined by this standard enable the use of signal paths separated as to signal type. In addition, a sufficient number of connections is reserved for audio and video signals to realize asymmetrical twotraffic along the audio and video signal paths. The transmission cross-talk can thereby be reduced to a minimum. In addition, the asymmetrical transmission limits the number of lines per signal path: thus, for n signals only $(n+1)$ lines are required per signal path (n signal lines and one common reference line), whereas $2n$ lines are always required in the case of a balanced signal transmission.

In practice, it often occurs that several transmission and/or receiver devices are accommodated in one apparatus. Thus the audio and video demodulator circuits of a TV receiver may apply audio and video signals to, for example, a TV monitor and consequently function as transmission devices. Conversely, for example, a video recorder or video disc player may apply audio and video signals to the audio and video processing and reproducing devices of a TV receiver, which devices thus function as receiver devices.

For practical reasons, the several devices of one apparatus are connected to one common supply reference potential. When interconnecting two such apparatuses, a parallel arrangement of the reference lines of two or more different signal paths is, however, brought about in each apparatus through the connections to the supply reference potentials. As a result of this parallel arrangement, part of one signal (for example, the video signal) may pass from one (video) signal path into the other signal path (for example, the audio signal path) and vice versa, and may give rise to cross-talk components across the impedance of the relevant lines, hereinafter referred to as line impedance, thereby causing the desired signal to be disturbed.

The preliminary publication "Differential technology in recording consoles and the impact of transformerless circuitry on grounding technique" by Thomas M. Hay, presented at the $68^{th}$ AES Convention in Hamburg on Mar. 17–20, 1981, particularly in FIGS. 10–18, shows circuits for suppressing 50/60 Hz supply hum which may be induced in a signal path from transmission to receiver device.

SUMMARY OF THE INVENTION

It is an object of the invention to obviate the cross-talk between two distinctly desired signals, which cross-talk is caused by the aforementioned parallel arrangement of the reference lines of two asymmetrical signal paths.

According to the invention, a system of the type described in the opening paragraph is characterized in that a differential stage is disposed in at least one of the devices for common mode suppression between a pair of input terminals and a pair of output terminals, said differential stage, if disposed in one of said transmission devices, having one end connected through a signal terminal of the pair of input terminals to a signal source and through a reference terminal to one of the two supply reference potentials, and having the other end connected through a signal terminal of the pair of output terminals to the signal line and through a reference terminal to the reference line of one of the two signal paths, or, if disposed in one of said receiver devices, having one end connected through the input signal terminal to the signal line and through the input reference terminal to the reference line of one of the two signal paths, and having the other end connected through the output signal terminal to a signal processing device and through the output reference terminal to one of the two supply reference potentials.

The invention is based on the recognition of the fact that the cross-talk components — in the same way as the induced hum in the aforementioned known hum suppression circuits — occur in common mode and that the desired signal occurs in differential mode on the signal and reference lines of a signal path.

When using the system according to the invention the differential stage blocks the passage of the common mode cross-talk components at the input or output of a signal path and is only transparent to the desired differential mode signals. The parallel arrangement is thus interrupted for these common mode cross-talk components, while a multiple asymmetrical signal generation or processing of different signals by means of only one common supply reference potential per apparatus need not be modified.

A preferred embodiment of a system of this type in which audio and video signals are generated, transmitted and received, is characterized in that the differential stage is disposed in the audio transmission or audio receiver device, thus imposing only slight requirements on the bandwidth of the differential stage.

A system of this type may be rendered suitable for transmitting first and second audio signals by disposing a further signal line in the audio signal path.

A transmission device for use in the latter system is characterized by a further differential stage whose input reference terminal, together with that of the firstmentioned differential stage, is connected to the same supply reference potential and whose input signal terminal is connected to a further audio signal source, an output reference terminal, together with that of the first-mentioned differential stage, being connected to the same reference line and an output signal terminal being connected to the further signal terminal.

In this device each differential stage is preferably provided with a transistor pair in long-tail configuration, with one of the base electrodes of each transistor pair being connected for alternating current to the relevant supply reference potential so as to obtain an asymmetrical signal input.

A receiver device for use in the latter system is characterized by a further differential stage having an input reference terminal together with that of the firstmentioned differential stage connected to the same audio reference line, and having an input signal terminal coupled to the further audio signal line, an output reference terminal, together with that of the first-mentioned differential stage, being coupled to the same supply reference potential and an output signal terminal being coupled to a further audio signal processing device.

In this device each differential stage is preferably provided with an operational differential amplifier having an asymmetrical signal output.

BRIEF DESCRIPTION OF THE DRAWINGS

The invention will further be described with reference to the FIGS. shown in the drawings.

In the drawings.

DETAILED DESCRIPTION OF THE INVENTION

Figure 1:
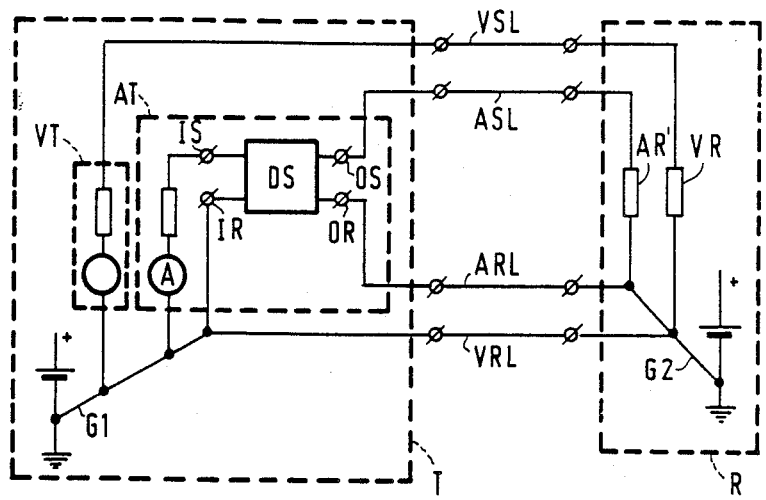
FIG. 1 shows a system comprising an audio transmission device according to the invention.

FIG. 1 shows a system for asymmetrical transmission of audio and video signals from audio and video transmission devices AT and VT, respectively, incorporated in one apparatus T — such as, for example, a TV receiver, a video recorder, a video disc player, a home computer, etc. — through audio and video signal paths (ASL, ARL) and (VSL, VRL), respectively, to audio and video receiver devices AR' and VR, respectively, likewise incorporated in one apparatus R such as, for example, a TV monitor or one of the aforementioned apparatuses. The audio and video transmission devices AT and VT are connected to one common supply reference potential G1 of the apparatus T. The audio and video receiver devices AR' and VR are connected to one common further supply reference potential G2 of the apparatus R. The video signal path comprises a video signal line VSL through which video signals from the video transmission device VT are applied to the video receiver device VR, and a video reference line VRL which interconnects the two supply reference potentials G1 and G2. The video signals supplied from the video receiver device VR to the supply reference potential G2 return through the video reference line VRL to the video transmission device VT. Correspondingly, the audio signal path comprises an audio signal line ASL through which audio signals are applied from the audio transmission device AT to the audio receiver device AR', and an audio reference line ARL coupled to the supply reference potential G2, through which audio reference line the audio signals supplied from the audio receiver device AR' to the last-mentioned supply reference potential G2 return to the audio transmission device AT. In practice, these signals and reference lines have a certain finite, distributed line impedance.

In conventional systems, the audio reference line ARL in the apparatus T would also be connected to the supply reference potential G1 and is thereby arranged in parallel with the video reference line VRL. As a result the video signal in such conventional systems may partly return through the audio reference line ARL, and a part of the audio signal may return through the video reference line VRL to the video and audio transmission devices VT and AT, respectively. As a result a signal mixing or cross-talk is caused across the line impedances in the two signal paths (VSL, VRL) and (ASL, ARL).

In the embodiment shown, the audio transmission device AT includes a differential stage DS interrupting the unwanted parallel arrangement. The differential stage DS is provided with a pair of input terminals IS, IR, one of which — hereinafter referred to as the input signal terminal IS — is coupled through a source resistor to an audio source A and the other of which — hereinafter referred to as the input reference terminal IR — is coupled to the supply reference potential G1. Consequently, an asymmetrical design of the audio source A remains possible. The differential stage DS is provided with a pair of output terminals OS, OR to which the difference between the signals applied to the pair of input terminals, that is to say, the audio signal to be transmitted, appears in amplified or unamplified form. One of the two terminals of the pair of output terminals — hereinafter referred to as the output signal terminal OS — is coupled to the audio signal line ASL. The other terminal — hereinafter referred to as the output reference terminal OR — is coupled to the audio reference line ARL.

For differential mode signals, the differential stage DS has an output impedance which is very low relative to the line impedance. For common mode signals the differential stage DS has a comparatively high output impedance, notably relative to the line impedance. The differential stage DS thus closes the audio loop which is constituted by the audio signal line ASL, the input impedance of the audio receiver device AR' and the audio reference line ARL. This audio loop is connected at only one point, namely at the connection point to the further supply reference potential G2, to the video loop constituted across the video transmission device VT, the video signal line VSL, the input impedance of the video receiver device VR and the video reference line VRL. A mutual signal mixing or cross-talk is thereby excluded or at least greatly reduced.

Figure 2:
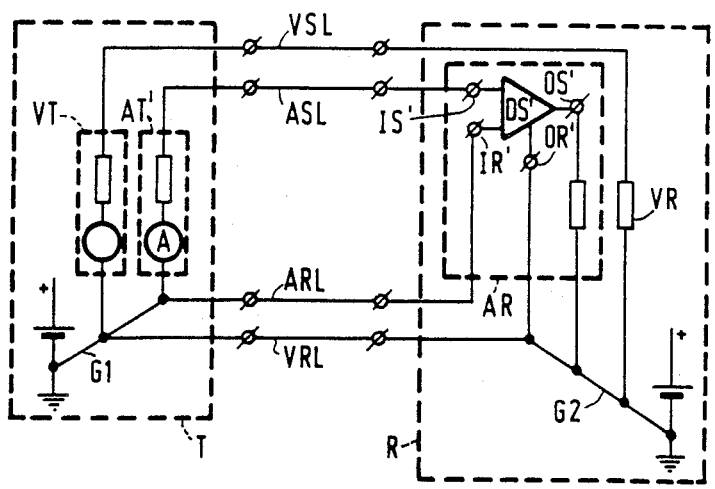
FIG. 2 shows a system comprising an audio receiver device according to the invention.

FIG. 2 shows a further embodiment of a system according to the invention in which elements having the same function as those in FIG. 1 have the same reference indications. Unlike the embodiment described above the audio signal to be transmitted in this system is supplied from the asymmetrical audio source A of an audio transmission device AT''— which together with the audio reference line ARL is connected to the first supply reference potential G1 — to an audio receiver device AR incorporating a differential stage DS'. This differential stage DS' shows at its pair of input terminals IS', IR' a comparatively high impedance for common mode input signals, relative to the line impedance.

Since the pair of input terminals IS', IR' is connected to the audio signal and audio reference lines ASL and ARL, the differential stage DS' closes the audio loop which is also constituted by the last-mentioned lines and the audio transmission device AT'. This loop is coupled at only one point, namely at the point of connection to the supply reference potential G1, to the video loop so that also in this case a signal mixing or cross-talk is excluded or at least greatly reduced.

To realize asymmetrical signal processing in the apparatus R, the differential stage DS' is provided with an asymmetrical pair of output terminals OS', OR' one of which — hereinafter referred to as the output reference terminal OR'— is connected to the further supply reference potential G2 and the other of which — hereinafter referred to as the output signal terminal OS'— is connected to an asymmetrical input of a signal processing device of the audio receiver device AR.

It stands to reason that the systems shown are also realized when the devices are incorporated at one end of the signal paths in different, separate apparatuses connected to one common supply reference potential, that the use of the invention is also possible when a transmission and a receiver device are mutually connected to one common supply reference potential at each of the two ends, and that a combination of the embodiments shown in the FIGS. 1 and 2 is possible, as well as the use of a differential stage in the video loop.

Figure 3:
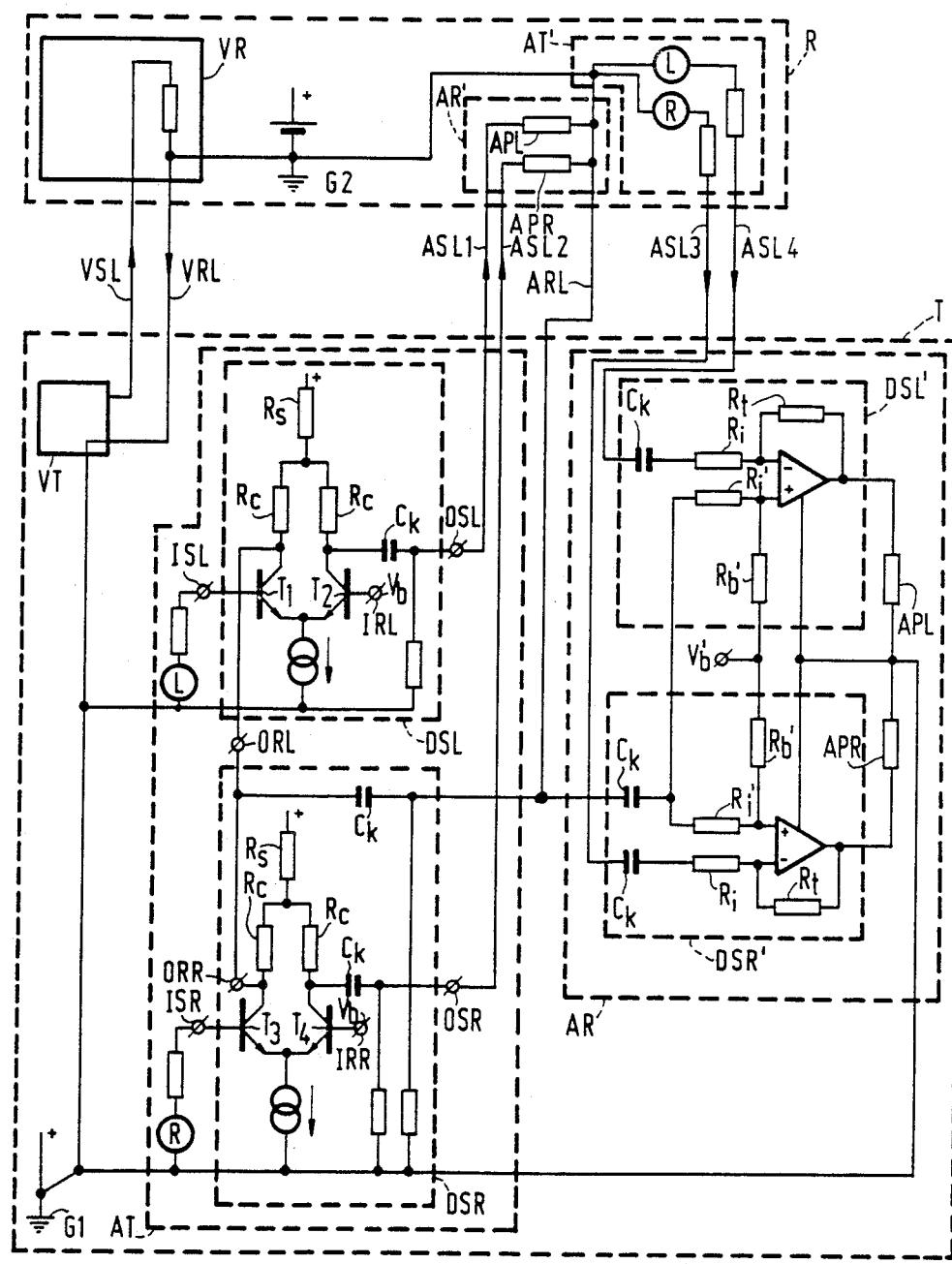
FIG. 3 shows a system according to the invention constituted by interconnection of a stereophonic TV receiver provided with the devices shown in the previous Figures, including a peripheral apparatus, for example, a video recorder.

FIG. 3 shows a coupling in accordance with the aforementioned European standard between a video transmission device VT, a stereophonic audio transmission device AT and a stereophonic audio receiver device AR, which are connected to the supply reference potential G1 and may occur in one apparatus T, for example, a stereophonic TV receiver. A video receiver device VR, a stereophonic audio receiver device, AR' and a stereophonic audio transmission device AT' are connected to one common further supply reference potential G2 and may both occur in one peripheral apparatus R, for example, a stereophonic video recorder.

The stereophonic audio transmission device AT', may comprise asymmetrical output circuits of a stereo decoder functioning as left and right stereo signal sources L and R, while the stereophonic audio receiver device AR' may comprise asymmetrical left and right stereo signal processing and reproducing circuits APL and APR.

In order to realize a broad-band separation between the video loop and the audio loop, differential stages are incorporated not only for the two audio signals, i.e. for both the left and right stereo signals, but also for the two directions, that is to say, both in the audio path from T to R and vice versa. For practical reasons, it is preferable to accommodate these differential stages in one apparatus, for example, as shown in the apparatus T.

In the audio transmission device AT of the apparatus T, the left and right differential stages DSL and DSR are thus connected to the outputs of the left and right stereo signal sources L and R, respectively, and in the audio receiver device AR, the left and right differential stages DSL' and DSR' are connected to the inputs of the left and right stereo signal processing and reproducing circuits APL and APR, respectively. Each of the two differential stages DSL and DSR includes emitter-coupled transistor pairs ($T_1$, $T_2$) and ($T_3$, $T_4$), respectively, having a current source in the emitter tail coupled to the first supply reference potential G1, and collector resistors $R_c$ which are coupled to a supply voltage (+) via a common high-impedance resistor R functioning as a current source. One of the base electrodes of each transistor pair ($T_1$, $T_2$) and ($T_3$, $T_4$) is connected through input signal terminals ISL and ISR, respectively, to the left and right stereo signal sources L and R, respectively, and the other base electrode is connected through input reference terminals IRL and IRR, respectively, to a bias voltage $V_B$ and hence AC-connected to the first supply reference potential G1.

One of the two collectors of each transistor pair ($T_1$, $T_2$) and ($T_3$, $T_4$) is coupled through a coupling capacitor $C_k$ and input terminals OSL and OSR, respectively, to first and further (or second) audio output signal lines ASL 1 and ASL 2, respectively, and the other collector is connected through output reference terminals ORL and ORR, respectively, and a coupling capacitor $C_k$ to the audio reference line ARL. The differential stages DSL and DSR separate the audio output signal lines ASL1 and ASL2 and the audio reference line ARL in a broad band from the first supply reference potential G1. A parallel arrangement of the audio reference line ARL with the video reference line VRL via the audio transmission device AT is thereby prevented.

A parallel arrangement of ARL with VRL via the audio receiver device AR is prevented by the differential stages DSL' and DSR'. Each differential stage comprises an operational differential amplifier an inverting input of which is connected through an input resistor $R_i$ and a coupling capacitor $C_k$ to first and further or second audio input signal lines ASL3 and ASL4, respectively, while a non-inverting input is connected at one end through an input resistor $R_i'$ and a coupling capacitor $C_k$ to the audio reference line ARL and at the other end through a resistor $R_b'$ to a bias voltage $V_b'$ and is consequently AC-connected for an alternating current to the first supply reference potential G1. An output of each operational amplifier is feedback negatively through a negative feedback resistor $R_t$ to the inverting input. In order to obtain a correct compensation of common mode components in the differential stages DSL' and DSR', the respective input resistors $R_i$ and $R_i'$, the respective negative feedback resistors $R_t$ and the respective resistors $R_b'$ should have the same value.

Each operational amplifier is provided with an asymmetrical output, an output signal terminal of which is connected to the left and right stereo signal processing circuits APL and APR, respectively, and an output reference terminal of which is coupled to the first supply reference potential G1.

In a practical embodiment, the resistors $R_c$, $R_i$, $R_t$ and the coupling capacitor $C_k$ have the values 500 Ohm, 10 kOhm, 10 kOhm and 10 $\mu$F, respectively.

It stands to reason that the invention is not limited to the embodiment shown, but that, for example, the arrangement of the differential stages DSL and DSR is also applicable in the audio receiver device AR: alternatively, the audio circuits AR' and AT' may comprise these differential stages. These audio circuits AR' and AT' and the video receiver device VR' may be incorporated in separate apparatuses which are connected to one and the same supply reference potential.

What is claimed is:

1. A system for asymmetrical signal transmission from a pair of transmission devices consisting of an audio and a video transmission device through a pair of signal paths consisting of an audio and a video signal path each having at least one signal line and one reference line to a pair of receiver devices consisting of an audio and a video receiver device, two of the devices having a supply reference potential in common and are coupled to one end of the two signal paths, and the other two of the devices having a further supply reference potential in common and are coupled to the other end of the two signal paths, characterized in that a first differential state is disposed in the audio transmission device or the audio receiver device to provide common mode suppression between a pair of input terminals of said first differential stage and a pair of output terminals of said first differential stage, said first differential stage, if disposed in said audio transmission device, having a signal terminal of the pair of input terminals connected to a signal source and having a reference terminal of the pair of input terminals connected to one of the two supply reference potentials, and having a signal terminal of the pair of output terminals connected through one of the signal lines to said audio receiver device and a reference terminal of the pair of output terminals connected through one of the signal lines to said audio receiver device and a reference terminal of the pair of output terminals connected to one of the reference lines, or, if disposed in said audio receiver device, having said signal terminal of the pair of input terminals connected through one of the signal lines to said audio transmission device and having the reference terminal of the pair of input terminals connected to one of the reference lines, and having the signal terminal of the pair of output terminals connected to a signal processing device and having the reference terminal of the pair of output terminals connected to one of the two supply reference potentials.

2. A system for asymmetrical signal transmission as claimed in claim 1, wherein the first differential stage is disposed in the audio transmission device and one of the signal paths comprises a further signal line, said audio transmission device further including a further differential stage having an input reference terminal connected to the same supply reference potential as the input reference terminal of the first differential stage; an input signal terminal connected to a further signal source; an output reference terminal connected to the same reference line as the output reference terminal of the first differential stage; and an output signal terminal connected to said further signal line.

3. A transmission device as claimed in claim 2, characterized in that said first and further differential stages each includes an emitter-coupled transistor pair having a current source between the coupled emitters and the relevant supply reference potential, one base electrode of each transistor pair being connected for alternating current through the input reference terminal to the said supply reference terminal at one end, and the other base electrode of the transistor pair of the first and further differential stages being coupled through the first and further input signal terminals, respectively, to the first and further signal sources, respectively, and one collector of each transistor pair being coupled at the other end for alternating current through the output reference terminal to the reference line of the audio signal path and the other collector of the transistor pair of the first and further differential stages being coupled through the output signal terminal to the first and further signal lines, respectively, of the audio signal path.

4. A system for asymmetrical signal transmission as claimed in claim 1, in which the audio signal path also includes a further signal line, said audio receiver device being provided with said first differential stage, characterized by a further differential stage having an input reference terminal connected to the same reference line as the input reference terminal of said first differential stage, an input signal terminal coupled to said further signal line, an output reference terminal coupled to the same supply reference potential as the output reference terminal of said first differential stage and an output signal terminal being coupled to a further audio signal processing device.

5. The system of claim 4, characterized in that each differential stage includes an operational amplifier having an inverting and a non-inverting input, and an asymmetrical output, each of said non-inverting inputs being coupled through the respective input reference terminal to the respective audio reference line and said inverting input of the operational amplifier of said first and further differential stages being coupled through the input signal terminal to the first and further audio signal lines, respectively, said asymmetrical output of the first and further differential stages being coupled through the output signal terminal to the first and further audio signal processing devices, respectively, and through the output reference terminal to the said supply reference potential.

6. A system for asymmetrical signal transmission of a video signal and a first audio signal, said system comprising:
  (a) means for transmitting said video signal;
  (b) means for receiving said video signal coupled to said video signal transmitting means by a video signal path,
  (c) means for transmitting said first audio signal, said first audio signal transmitting means being coupled to said video signal transmitting means through a common supply reference potential;
  (d) means for receiving said first audio signal, coupled to said first audio signal transmitting means by a first audio signal path separate from said video signal path; and
  (e) a first differential stage coupled to said first audio signal path to provide common mode suppression of cross-talk components of said video signal in said first audio signal path due to said common supply reference potential.

7. The system of claim 6 wherein said first differential stage is disposed in said first audio signal transmitting means.

8. The system of claim 6 wherein said first differential stage is disposed within said first audio signal receiving means.

9. The system of claim 6 further comprising:
  (a) means for transmitting a second audio signal;
  (b) means for receiving said audio signal coupled to said second audio signal transmitting means by a second audio signal path; and
  (c) a second differential stage coupled to said second audio signal path.

10. The system of claim 6 wherein said first differential stage comprises an operational amplifier.

11. The system of claim 6 wherein said first differential stage comprises an emitter-coupled transistor pair.

* * * * *